May 16, 1944.   C. V. DI PIETRO   2,348,791
CARBONATOR
Filed Aug. 14, 1939   2 Sheets-Sheet 2
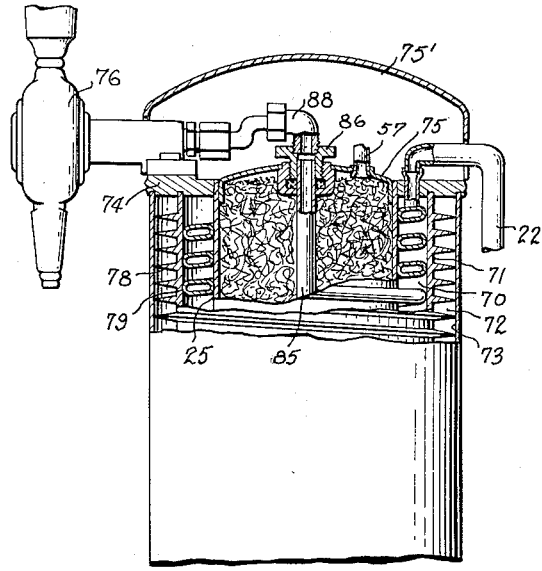
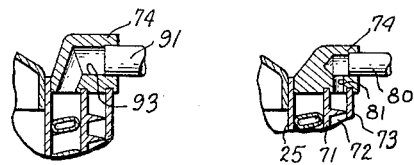
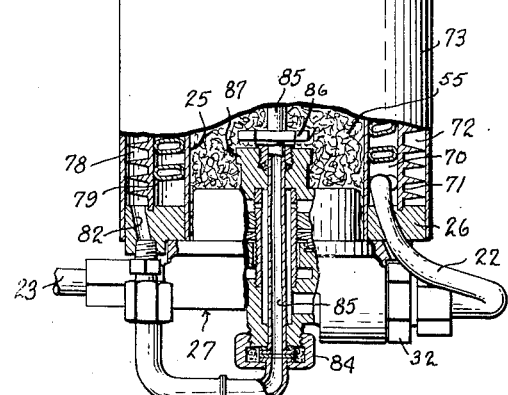
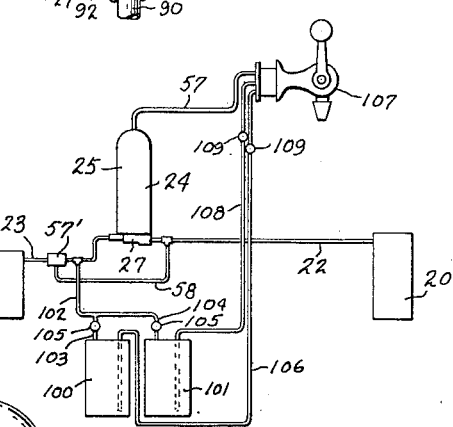
INVENTOR.
Carmelo V. DiPietro
ATTORNEY.

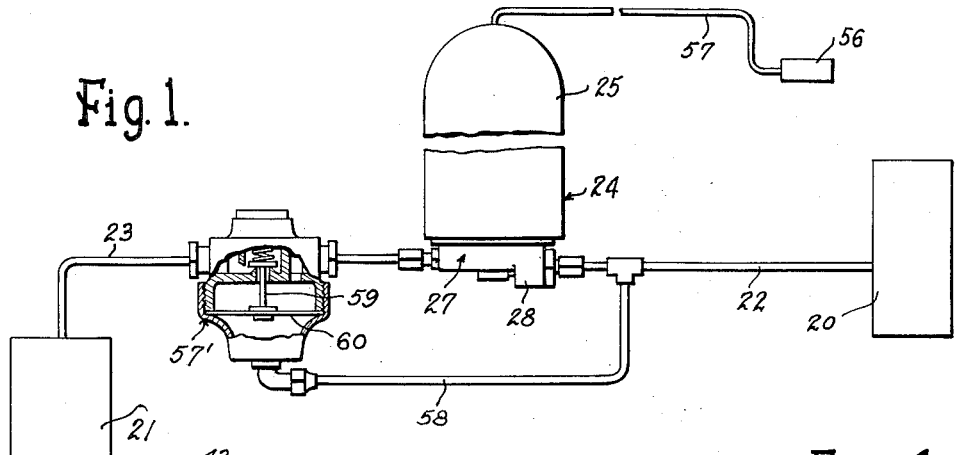
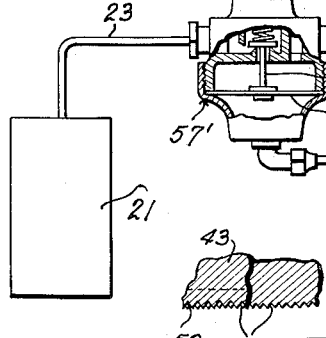
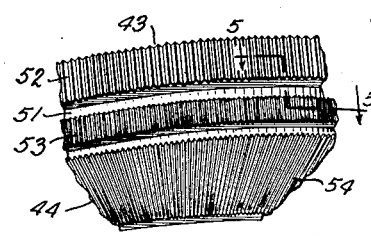
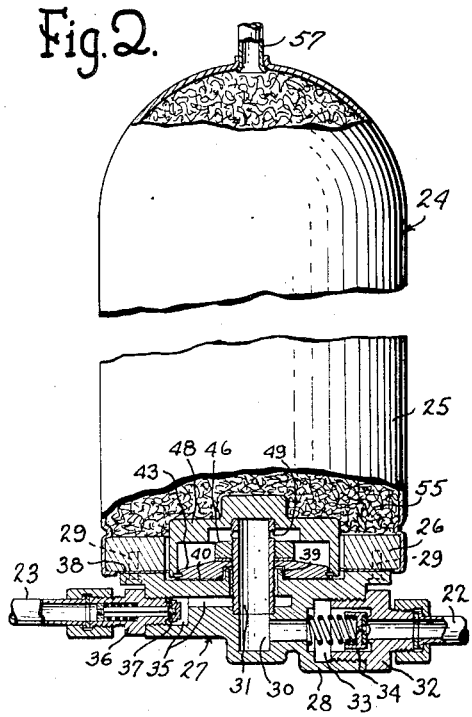
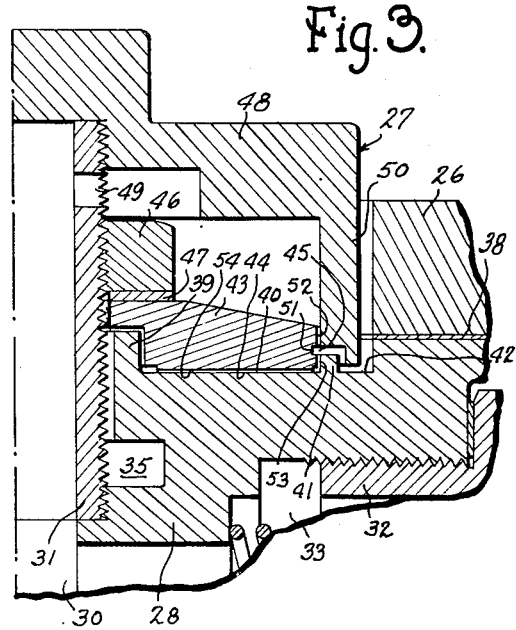
INVENTOR.
Carmelo V. DiPietro

Patented May 16, 1944

2,348,791

UNITED STATES PATENT OFFICE 2,348,791

CARBONATOR

Carmelo V. Di Pietro, Birmingham, Mich.

Application August 14, 1939, Serial No. 289,984

10 Claims. (Cl. 261—11)

This invention relates to devices for dispensing drinks and more particularly to such devices in which water and carbon dioxide are mixed and dispensed either as carbonated water or with a beverage.

Various types of equipment are now employed to charge water with carbon dioxide just prior to dispensing the same at a beverage station. One type of device utilizes a motor-operated agitator to mix carbon dioxide gas with water, another type of device relies upon a sinuous path of travel to mix carbon dioxide gas with water and still another type of device utilizes a porous receptacle through which carbon dioxide gas and water are forced in intermingling relation. Such devices are expensive, or are bulky, or do not deliver carbonated water with sufficient gas charge.

Such devices are connected to town or city water mains and thus the water temperature and pressure fluctuates. Temperature and pressure influences the quantity of carbon dioxide gas that can be absorbed and retained by the water after it is dispensed. As carbon dioxide gas has been liberated in a constant volume flow in the previously known carbonating systems, variances in water pressure and temperature have influenced the amount of gas absorbed and retained by the water. None of the devices with which I am familiar makes provisions for regulating temperature and water flow in proportion to gas flow so that constant proportions can be obtained at a dispensing station.

An object of this invention is to provide a device that will mix carbon dioxide gas with water so that the mixture can be dispensed at a beverage station in desired proportions even though the water supply pressure may vary.

Another object of the invention is to provide a substantially instantaneous mixer for carbon dioxide gas and water under pressure that can be connected with a dispensing faucet to supply a mixture having constant desired proportions.

A further object of the invention is to provide a mixer for carbon dioxide gas and water under pressure that utilizes the pressures and spray distribution to effect the desired saturation.

Another object of the invention is to provide a compact, inexpensive device that will mix a liquid and carbon dioxide gas in uniform proportions and dispense the same without change.

Another object of the invention is to provide a unitary device that will cool and dispense a drink fluid and also saturate cooled water with carbon dioxide and dispense the same at a beverage station.

Another object of the invention is to provide apparatus for dispensing charged water and a beverage syrup under pressure from any one of a plurality of sources from a single faucet in uniform proportions.

With the above and other objects in view, which will appear as the description proceeds, the invention resides in the novel construction, combination, and arrangements of parts substantially as hereinafter described and more particularly defined by the appended claims, it being understood that such changes in the precise embodiments of the herein disclosed invention may be made as come within the scope of the claims.

In the accompanying drawings, Fig. 1 is a diagrammatical view of apparatus incorporating the invention for mixing water and carbon dioxide gas.

Fig. 2 is a sectional view of the mixing and storage device;

Fig. 3 is an enlarged fragmentary sectional view of the water and gas mixer;

Fig. 4 is a fragmentary perspective view of the metering disk for the water and gas;

Fig. 5 is a sectional view of the metering disk taken on line 5—5 of Fig. 4;

Fig. 6 is an elevational view, partly in section, showing a refrigerated device for mixing water and gas and for dispensing the same and a separate liquid from faucets;

Fig. 7 is a top plan view of the device shown in Fig. 6 with the cap removed;

Fig. 8 is a sectional view taken on line 8—8 of Fig. 7;

Fig. 9 is a sectional view taken on line 9—9 of Fig. 7;

Fig. 10 is a sectional view taken on line 10—10 of Fig. 7;

Fig. 11 is a diagrammatical view of apparatus in which the water and gas mixer and syrup containers are associated to feed to a mixing and dispensing faucet.

Referring now to Figs. 1 to 5 of the drawings, 20 indicates, in greatly reduced proportions, a source of water under pressure as usually provided in towns and cities, or a container under gas or air pressure. A carbon dioxide gas container, in reduced proportions having a conventional valved outlet (not shown) is indicated by numeral 21. A mixing and dispensing device 24 is connected with the water source by conductor means such as conduit 22 and with the gas container by conductor means such as conduit 23. The device is comprised of a shell 25 having an open end that is spun over a base ring 26, and associated with the shell and base ring is a unit having conductor means and a mixer indicated generally by the numeral 27.

This unit 27 is composed of several elements that are associated to connect with the water and gas conduits and mix the water and gas before releasing it to the interior of the storage shell 25. A header or carrier member 28, in the form of a casting, has an upper circular face that is complementary to the base ring 26 and detachably fixed thereto by suitable securing means such as bolts 29. A ring gasket 38 is interposed between the carrier and the base ring before attachment. The carrier is formed with an axial two-diameter opening 30 into the smaller portion of which is screwed a threaded tube 31. Coupling 32 is screwed into a passage 33 that communicates with the bottom of opening 30 and this coupling has the water conduit 22 attached thereto. In the coupling is a spring closed check valve 34. Another passage 35 is provided in the carrier which communicates with the larger diameter portion of opening 30 above passage 33. A coupling 36 is screwed into this passage 35 and has the gas conduit 23 coupled thereto. In the coupling 36 is arranged a spring closed check valve 37. The pressure of the gas and water flowing through the feed conduits 22 and 23 will open the valves 34 and 37.

Surrounding the upper end of the passage 30 in the carrier is a short upstanding outlet flange 39 through which the tube 31 projects. The diameter portion of opening 30 is larger than the tube diameter and thus the gas flows out of the carrier around the tube while the water flows out of the carrier through the tube.

The upper face of the carrier adjacent the flange 39 is recessed to form a flat seat 40 and terminates in an upstanding circular flange 41, and another recess 42 is formed in the top face of the carrier outside of flange 41. A disk or diffuser member 43 is piloted on the threaded tube 31 until its face 44 seats against the carrier surface 40 between flanges 39 and 41. This disk serves to guide the gas flowing from the carrier to the mixing chamber 45, and is complementary to and slightly spaced from the carrier flange 39 for this purpose. The disk is positioned against the face 40 of the carrier then nut 46 is screwed on the tube against a gasket ring 47 to secure the ring member and to seal the disk to prevent gas from entering water from elsewhere but the mixing chamber.

A cap 48 is screwed on the upper end of the tube 31 and is associated with the disk and the carrier to assist in forming the mixing chamber 45 and a water conductor means leading to the chamber. The cap is spaced above the nut 46 and the upper face of the disk forming a space into which water flows through an aperture 49 in the tube. The cap flange 50 closely surrounds the upper peripheral portion of the disk and is spaced above the flange 41 and projects into recess 42. The cap flange is also spaced from the periphery of recess 42 and the base ring through which it projects when assembled, such spaced relation providing an outlet for the mixture leaving the mixing chamber.

The carrier and the elements mounted thereon form a unit structure that can readily be attached to or detached from the base ring, and the parts of the unit can be readily associated or disassociated.

The peripheral face of the disk 43 is divided into upper and lower portions by a circular groove 51 and such portions are formed with grooves 52 and 53 thereacross extending in a direction parallel to the disk axis. The periphery of the upper peripheral portion is formed to bear against flange 50 of the cap and the grooves 52 therein thus form passages through which water sprays into the mixing chamber groove 51. The lower peripheral face portion of the disk fits into and bears against the flange 41 so the grooves 53 therein provide outlet passages for spraying the gas into the mixing chamber groove 51. The grooves 52 and 53 are formed entirely around the disk and are extremely small, the water passages being larger than the gas passages. The relative sizes of such passages are of course designed to provide the relative flow as desired for the constituents of the mixture. The bottom face 44 of the disk is formed with radially extending grooves 54 through which gas must flow to the grooves 53, these grooves 54 are similar in shape to grooves 53.

It will be seen that water and carbon dioxide gas will flow separately under pressure to the mixing chamber 45 and that the water and gas will be separated minutely by grooves 52 and 53 just prior to being released for mixing. Thus finely divided water and gas are released toward each other in groove 51 and a violent turbulence occurs that thoroughly mixes gas and water to a desired extent. As the mixing chamber and outlet to the interior of shell 25 is angular, further intermingling of the gas with the water is had before release into the final mixing and storage chamber.

The storage chamber is preferably substantially filled with closely packed material 55, such as stainless steel wool, or other material that will not contaminate the carbonated water and that the carbon dioxide gas has an affinity for. This material attracts carbon dioxide gas in the carbonated water which clings thereto in thousands of small gas bubbles. The greater the amount of material used in the shell the greater will be the surface that attracts the gas. Thus gas is retained by the material that would otherwise rise to the top of the shell and be expelled as free gas when the faucet is opened. In addition to retaining the carbon dioxide gas in the water until dissolved therein the steel wool in the shell causes further mixing of the soda water passing therethrough, thus assisting in saturating the water with gas.

A suitable outlet from the shell 25 is provided. A dispensing faucet, as indicated diagrammatically at 56, is connected to the interior of the storage and final mixing chamber by a conduit 57. The faucet may be fixed to the shell 25 or arranged remotely therefrom.

The quantity of water flowing to the mixing device in prior carbonator systems varies with pressure in the feeding conduit and as the carbon dioxide gas feed usually remains constant, difficulty has been had in maintaining a constant desired proportion of gas and water in the mixture. To eliminate this undesirable condition it is proposed to automatically control the gas flow through the mixing device in accordance with the water flow through the device. To this end a valve device 57' is interposed in conduit 23 and consists of a valve 59 attached to a diaphragm 60. A conduit 58 leads from conduit 22 to the side of the diaphragm opposite the valve to thus subject the diaphragm to the pressure of water flowing to the mixing device. The valve 59 is normally urged toward its seat by a spring and by pressure of the carbon dioxide gas, so that when the outlet faucet for the storage receptacle is closed the valve is seated shutting off gas flow to the mixing device. Upon relieving pressure in the storage receptacle, by drawing off some of the carbonated mixture, pressure between the valve device and the mixing device is relieved to thus allow the diaphragm to unseat the valve under pressure of the water in conduit 58.

Referring now to Figs. 6 to 10 of the drawings, the carbonator or water and gas mixer previously described is shown associated with a dispensing device having a refrigerating system and a separate liquid dispenser.

In this instance the lower end of the mixture storage chamber shell 25 is sealed to the inside of the ring plate 26 and the feeding and mixing unit includes the same elements arranged in the same manner and attached to the ring plate as previously described except as will be pointed out.

In this refrigerated form of the invention, the mixing and storage chamber is surrounded by a chamber 70 formed by a shell 71 and shell 71 is surrounded by a chamber 72 formed by an outer shell 73. These shells 71 and 73 are coextensive with shell 25 and are sealed at their base to the ring plate 26 and at their top to a ring plate 74. A canopy 75 seals the upper end of shell 25. Ring 74 carries the dispensing faucets 56 and 76 and cover 75'. A spiral fin 78 in the chamber 72 thermally contacts shells 71 and 73 and in the chamber 70 is arranged a spirally wound tube 79 which is in thermal contact with shells 25 and 71.

In this form of the invention a water feed conduit 80 is connected to a passage 81 in the ring plate 74 communicating with chamber 72 and a passage 82 in the bottom ring plate connects conduit 83 with the interior of chamber 72. This conduit 83 is connected by coupling 84 with a tube 85 that extends through the base of the carrier, the carrier, tube 31 and shell 25. The conduit is sealed by suitable couplings 86 with the carrier cap extension 87 and the cap 75. Coupling 88 connects the tube 85 with faucet 76. The water flowing from conduit 80 will thus pass down through the outer chamber so that it will be cooled and up through tube 85 in the inner chamber. Obviously any form of liquid beverage could be cooled and dispensed in this manner instead of water. In this instance the faucet 56 with which the interior of the storage chamber is connected by conduit 57 is carried directly on the top of the mixing and refrigerated storage device.

The chamber 70 is arranged to contain refrigerant and can be connected to a suitable refrigerating system by inlet conduit 90 and outlet conduit 91. The lower ring plate has a passage 92 therethrough for connecting conduit 90 with the chamber 70 and the top ring plate has a passage 93 therethrough connecting the chamber with outlet conduit 91. The conduits 22, 80, and 91 are preferably thermally associated by suitable means.

The water feed conduit 22 is connected with an end of the coiled tubing 79 extending through the top ring plate. The bottom of the coiled tubing extends through the bottom ring plate and is connected to coupling 32. The water flowing to the mixing device is thus maintained at a low temperature that is substantially constant within a short range. As cold water will absorb and retain carbon dioxide gas more efficiently than warm water, this refrigerated device is useful for drink dispensing stations and other uses such as at bottling plants. As the faucets for the dispensing of beverages are thermally connected to the refrigerated dispensing device they are held cold continually thereby permitting the serving of beverages either at a continuous or intermittent rate at 40° or less.

In the embodiment of the invention shown in Fig. 11 the water and carbon dioxide mixing and storage apparatus shown in either one of the previously described embodiments of the invention may be used with one or more sources of syrup to provide a mixed drink at a dispensing faucet.

The system for mixing water and carbon dioxide gas and for storing the mixture is illustrated as that shown in Fig. 1 and similar reference numerals are employed where possible. A pair of closed receptacles 100 and 101 for containing syrup are connected with the gas feed line 23 between the pressure valve 57' and the mixing unit carrier 27 by a main conduit 102 and branch conduits 103 and 104. Flow control valves 105 are arranged one in each branch conduit. The upper surface of the syrup in the receptacles is thus subjected to the pressure of the gas in the feed line as regulated by the pressure valve 57'.

An outlet conduit 106 for syrup in receptacle 100 extends from adjacent the bottom thereof to a dispensing faucet 107 and a similar outlet conduit 108 leads from receptacle 101 to the faucet. A control valve 109 is disposed in each of these syrup outlet conduits. The outlet conduit 57 from the storage chamber for mixed water and carbon dioxide gas also extends to the faucet 107. The faucet is valved in any conventional manner to dispense carbonated water alone or with syrup from either one of the conduits 106 or 108.

The pressure of carbon dioxide gas on the syrup in the containers will cause the same to flow through the faucet with the carbonated water when the valve is open. The carbon dioxide gas flowing into conduit 102 will be utilized to compensate for any gas pressure drop at the mixing device which may be caused by lag in opening of the valve device 57'. Thus the auxiliary gas causing flow of syrup can also be utilized for maintaining gas pressure at the mixing device so that uniformity of gas flow to water flow into the receptacle will result.

In order to dispense syrup in uniform quantities with the carbonated water, the compensating valve 57' is taken advantage of by connecting the pressure line for the syrup between the valve and the mixing device. Thus the gas pressure on the syrup corresponds to gas pressure entering the mixing device and both vary in accordance with water pressure. In this manner a uniform mixture of soda water and syrup will be dispensed regardless of water pressure fluctuations. With this apparatus a palatable, properly mixed and carbonated cold beverage is always available. And where a refrigerated carbonator is employed the dispensed drink will have been instantaneous and automatically cooled, carbonated and mixed.

What is claimed is:

1. A device for charging water with carbon dioxide gas comprising a confined mixing chamber, sinuous outlet passage means leading from said mixing chamber, a closed storage chamber communicating with said outlet passage means, a pair of conductor means for feeding carbon dioxide gas and water under pressure separately, and means forming two series of circularly disposed small passages, each of said series of passages connecting one of the feeding conductor means with the mixing chamber and the outlet ends of said series of passages being oppositely disposed and relatively close.

2. The method of charging water with carbon dioxide gas comprising feeding separate streams of water and carbon dioxide gas in a uniform predetermined volume ratio by pressure from sources of supply, dividing the water and gas streams into a multiplicity of terminal streams, spraying the terminal streams directly into each other in said volume ratio in a relatively small chamber to intimately intermingle the same, and collecting the mixture of gas and water from the chamber in a container while in intimately intermingled condition.

3. The method of charging water with carbon dioxide gas comprising feeding separate streams of water and carbon dioxide gas in a constant predetermined volume ratio by pressure from sources of supply to terminals, reducing the temperature of the water during feeding, spraying the streams at their terminals into each other in a relatively small confined space to intimately intermingle the same, and collecting the spray from the mixing space in a confined cooled storage space while intimately intermingled.

4. In a device for mixing carbon dioxide and water, a disk having an annular recess dividing the peripheral surface into two sections, said peripheral sections having grooves therein extending in a direction axially of the disk, housing means into which the disk fits snugly and forming an outlet leading from the disk recess, means feeding water under pressure to the outer ends of the grooves in one peripheral disk section, and means conducting carbon dioxide gas to the grooves in the other peripheral disk section, said grooves feeding the gas and water toward each other into the disk recess.

5. In a water carbonator, a mixing device for water and carbon dioxide gas comprising a header having a top recess forming a flat surface, a disk in the recess having the under face radially grooved and seated on the flat surface of the header, the peripheral surface of the disk having grooves extending in an axial direction and an annular recess dividing the grooves into two series, a cap above the disk having a flange partially telescoping the upper grooved periphery of the disk, said cap forming a water feeding means to the upper grooves, and a feeding connection for carbon dioxide gas leading to the under radially grooved face of the disk.

6. In a water carbonator, a disk having axially extending grooves in the peripheral surface of minute cross section and an annular recess dividing the grooves into two series, one of the end faces of the disk having radially extending grooves therein, and a structure surrounding the disk for conducting carbon dioxide gas to the radial grooves and water across the other end face of the disk.

7. An instantaneous carbonator comprising a metal storage receptacle, metal wool substantially filling said receptacle and in thermal contact with the inner wall thereof, a mixing device in thermal contact with the bottom of said receptacle and open to the interior bottom portion thereof, a dispensing faucet leading from and in thermal contact with the top of said receptacle, a source of carbon dioxide gas under pressure, a source of water under varying pressure and temperature, separate conduit means leading from the source of water and from the source of gas, means maintaining the water and gas flowing from said conduit means to said mixing chamber at a substantially predetermined pressure ratio, and refrigerating means thermally surrounding the receptacle and the portion of the water conduit adjacent the mixing device maintaining the water, prior to mixture with the gas, and the mixed water and gas at a substantially fixed low temperature.

8. An instantaneous carbonator comprising two telescoped metal receptacles forming separated inner and outer chambers, a refrigerating system in the outer chamber, a water conduit in the outer chamber, a mixing device fixed to the bottom of the inner receptacle and open to the bottom of the inner chamber, metal wool substantially filling the inner receptacle, a dispensing faucet connected with the top of the inner chamber and in thermal contact with the receptacle, said water conduit in the outer chamber extending to the mixing device, a carbon dioxide conduit leading to the mixing device, and means automatically maintaining the pressure in said conduits at a substantially definite predetermined ratio.

9. An instantaneous carbonator comprising two spaced telescoped metal receptacles having a common top and bottom and forming separated inner and outer chambers, a refrigerating system connected to flow through the outer chamber, in thermal contact with the inner receptacle, a water supply conduit passing through the refrigerant chamber, a mixing device fixed to the bottom and open to the lower portion of the inner chamber, the outlet end of the refrigerated water conduit being open to said mixing device, a carbon dioxide conduit leading to the mixing device, means for maintaining the water and gas pressures in said conduits in a substantially fixed ratio, and a dispensing outlet conduit leading from the top of and open to the inner chamber.

10. A device for charging water with carbon dioxide gas comprising a storage receptacle having an outlet, a mixing device having two sets of multiple passages, means for feeding a stream of water to one of the sets of passages, means for feeding carbon dioxide gas to the other set of passages, a confined mixing chamber at the terminals of the sets of passages, said sets of passages directing the outgoing gas and water directly into each other in the chamber, and angularly extending passage means connecting the mixing chamber with the interior of the storage receptacle, said angular passage causing continued agitation of the mixture passing therethrough.

CARMELO V. DI PIETRO.